(12) United States Patent  
Kobayashi

(10) Patent No.: US 11,104,287 B2  
(45) Date of Patent: Aug. 31, 2021

(54) SIDE AIR BAG DEVICE

(71) Applicant: Yuto Kobayashi, Yokohama (JP)

(72) Inventor: Yuto Kobayashi, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 62 days.

(21) Appl. No.: 16/466,090

(22) PCT Filed: Nov. 13, 2017

(86) PCT No.: PCT/JP2017/040792  
§ 371 (c)(1),  
(2) Date: Jun. 3, 2019

(87) PCT Pub. No.: WO2018/105324  
PCT Pub. Date: Jun. 14, 2018

(65) Prior Publication Data  
US 2020/0062207 A1 Feb. 27, 2020

(30) Foreign Application Priority Data

Dec. 5, 2016 (JP) .............................. JP2016-235919

(51) Int. Cl.  
*B60R 21/16* (2006.01)  
*B60R 21/207* (2006.01)  
(Continued)

(52) U.S. Cl.  
CPC .......... *B60R 21/207* (2013.01); *B60R 21/237* (2013.01); *B60R 21/23138* (2013.01);  
(Continued)

(58) Field of Classification Search  
CPC . B60N 2/427; B60R 21/23138; B60R 21/207; B60R 21/237; B60R 21/201; B60R 2021/161; B60R 2021/23146  
(Continued)

(56) References Cited

U.S. PATENT DOCUMENTS 8,459,690 B2 6/2013 Breuninger et al.  
8,814,204 B2 * 8/2014 Fukawatase .......... B60R 21/207  
280/730.2  
(Continued)

FOREIGN PATENT DOCUMENTS

EP 2567870 A1 3/2013  
JP 2009023490 A 2/2009  
(Continued)

OTHER PUBLICATIONS

International Search Report (in English and Japanese) and Written Opinion (in Japanese) issued in PCT/JP2017/040792, dated Feb. 6, 2018; ISA/JP.

*Primary Examiner* — Toan C To  
(74) *Attorney, Agent, or Firm* — Stephen T. Olson; Harness, Dickey & Pierce, P.L.C.

(57) ABSTRACT

A side airbag device includes a seat frame that is along a side surface of a seatback of a seat and is built in the seatback, an inflator that is attached to an occupant side of the seat frame, and a cushion that receives a gas from the inflator so as to be expanded and deployed. The cushion includes an inner side expansion part that is stored at the occupant side of the seat frame and is connected to the inflator, and an outer side expansion part that is continuously provided with the inner side expansion part, that is stored at an opposite side of the seat frame with respect to the occupant side, and that receives the gas from the inner side expansion part so as to be expanded and deployed.

14 Claims, 7 Drawing Sheets

(51) Int. Cl.
  *B60R 21/231* (2011.01)
  *B60R 21/237* (2006.01)
(52) U.S. Cl.
  CPC ................... *B60R 2021/161* (2013.01); *B60R 2021/23146* (2013.01)
(58) Field of Classification Search
  USPC ..................................................... 280/730.2
  See application file for complete search history.

(56) References Cited

U.S. PATENT DOCUMENTS

| | | |
|---|---|---|
| 9,434,342 B2 | 9/2016 | Fujiwara |
| 2009/0020988 A1* | 1/2009 | Sato .................. B60R 21/23138 280/730.2 |
| 2011/0169250 A1 | 7/2011 | Breuninger et al. |
| 2012/0223550 A1* | 9/2012 | Mazanek ............... B60R 21/231 297/216.1 |
| 2016/0167611 A1 | 6/2016 | Fujiwara |
| 2017/0174174 A1* | 6/2017 | Ohno .................... B60R 21/235 |
| 2017/0225640 A1* | 8/2017 | Ohno .................... B60R 21/239 |
| 2018/0022309 A1* | 1/2018 | Kunisada ................ B60R 21/26 280/730.2 |
| 2018/0050651 A1* | 2/2018 | Fukawatase ...... B60R 21/23138 |

FOREIGN PATENT DOCUMENTS

| | | |
|---|---|---|
| JP | 2011527965 A | 11/2011 |
| JP | 2016112927 A | 6/2016 |
| JP | 2017144781 A | 8/2017 |

* cited by examiner

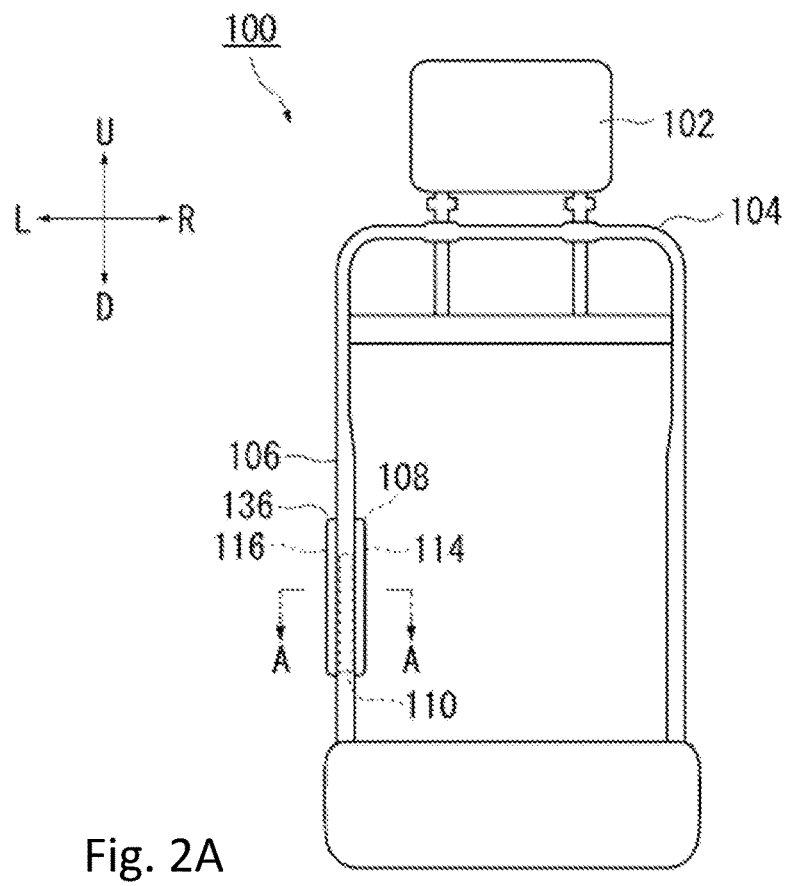
Fig. 2A
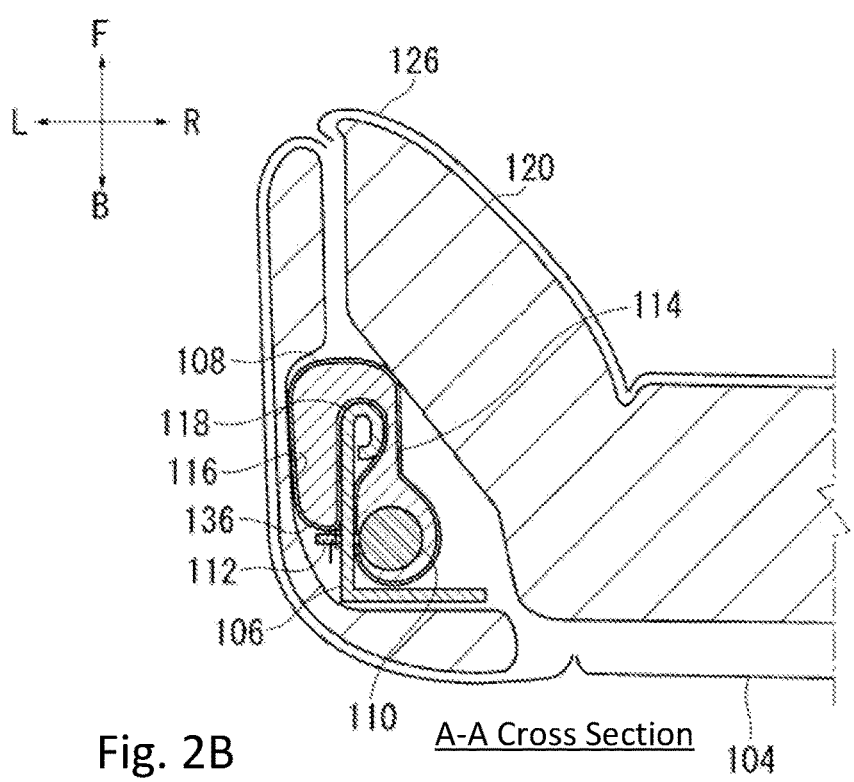
Fig. 2B  A-A Cross Section

SIDE AIR BAG DEVICE

CROSS-REFERENCE TO RELATED APPLICATIONS

This application is a 371 U.S. National Stage of International Application No. PCT/JP2017/040792, filed Nov. 13, 2017, which claims priority to Japanese Patent Application No. 2016-235919, filed Dec. 5, 2016. The entire disclosures of the above applications are incorporated herein by reference.

TECHNICAL FIELD

The present invention relates to a side airbag device that is provided at a vehicle seat.

BACKGROUND ART

In the recent years, an airbag device is mostly equipped with a vehicle as the standard equipment. The airbag device is a safety device being operated in an emergency such as a vehicle collision and protects an occupant by expanding and deploying an airbag cushion (simply described as a "cushion" below) with a gas pressure so as to receive the occupant.

There are various kinds of airbag devices according to the installation positions and the use. For instance, a front airbag device is provided at a center of a steering wheel so that a driver can be protected from a collision occurred from the forward and backward directions. In addition, in order to protect an occupant from an impact in a vehicle width direction by such as a side collision, a curtain airbag device is provided near a ceiling above a side window and a side airbag device is provided at a side part of a seat.

For instance, a vehicle seat that is equipped with a side airbag device is disclosed in Patent Document 1. In the technology in Patent Documents 1, the folded side airbag 36 is provided inside the seatback 12 and at an outside of the side frame 16A in the vehicle width direction, that is, at an opposite side with respect to an occupant.

PRIOR ART DOCUMENT

Patent Document

Patent Document 1: Japanese Patent Publication Number 2016-112927.

SUMMARY OF THE INVENTION

Problems to be Solved by the Invention

At the present time, with respect to a side airbag device, further improvement of an occupant restraint force is required. In order to improve the occupant restraint force, it is considered to take the measures that, for instance, a deployment position of an airbag cushion is set at a position being closer to an occupant. However, as shown in, for example, FIG. 3 and others in Patent Document 1, a seat pad that is obtained by utilizing such as a urethane material is filled inside the seatback. Therefore, because a storage space of the airbag cushion of the side airbag device is extremely limited, it is difficult to devise methods for the improvement of the occupant restraint force.

The present invention attempts to solve these problems. An object of the present invention is to provide a side airbag device that can be efficiently stored inside a seatback and can also improve the occupant restraint force.

Means for Solving the Problems

In order to solve the above problems, a configuration of a side airbag device according to the present invention includes: a seat frame that is along a side surface of a seatback of a vehicle seat, the seat frame being built in the seatback; an inflator that is attached to an occupant side of the seat frame; and an airbag cushion that receives a gas from the inflator so as to be expanded and deployed. The airbag cushion includes: an inner side expansion part that is stored at the occupant side of the seat frame and the inner side expansion part is connected to the inflator; and an outer side expansion part that is continuously provided with the inner side expansion part, the outer side expansion part is stored at an opposite side of the seat frame with respect to the occupant side, and the outer side expansion part receives the gas from the inner side expansion part so as to be expanded and deployed.

According to the configuration explained above, because the airbag cushion is stored by being divided into at the occupant side and at the opposite side of the occupant with respect to the seat frame, the limited space of the inside of the seatback can be efficiently utilized. As a result, it can be applied to various vehicle seats so as to have a high versatility. Further, because the installation space can be made narrow, the miniaturization of the vehicle seat can also be realized.

In addition, because the airbag cushion that has the configuration explained above starts to be expanded from the inner side expansion part that is stored at the occupant side of the seat frame, a reaction force directed from the seat frame toward the occupant side can be obtained at an early stage. The inner side expansion part is also the basis of the airbag cushion, and according to the configuration explained above, the airbag cushion after being expanded is also located at the position being closer to the occupant. Therefore, according to the configuration explained above, the occupant restraint force can be improved.

In the side airbag device, the outer side expansion part is stored in the seatback in a state in which the outer side expansion part directly comes in contact with the seat frame or a state in which the outer side expansion part indirectly comes in contact with the seat frame by sandwiching another member between the outer side expansion part and the seat frame. According to this configuration, when the outer side expansion part is expanded, the reaction force can be efficiently obtained by the seat frame, and an acceleration of the expansion and deployment and the improvement of the occupant restraint force can be realized.

The airbag cushion device explained above may have a first folded-back part that is located between the inner side expansion part and the outer side expansion part, and the airbag cushion is folded back along a front edge of the seat frame with respect to the first folded-back part. According to this configuration, the airbag cushion can be efficiently stored in the seatback.

The outer side expansion part explained above may include an outer contact part that directly comes in contact with a predetermined area of the seat frame extending from the front edge of the seat frame toward a vehicle rear or indirectly comes in contact with the predetermined area by sandwiching another member between the outer contact part and the predetermined area, and a second folded-back part with which the outer side expansion part is folded back from a rear end at a vehicle rear side of the outer contact part toward a vehicle front. According to this configuration, when the gas is flown into the outer side expansion part, due to the expansion of the outer side contact part and due to the expansion so as to make the second folded-back part to disappear, the outer side expansion part pushes the seat frame. As a result, the outer side expansion part becomes possible to efficiently receive the reaction force by the seat frame. Further, since the outer side expansion part is expanded and deployed by receiving the reaction force by the seat frame, the acceleration of the expansion and deployment of the entirety of the airbag cushion and the improvement of the occupant restraint force can be realized.

The outer side expansion part explained above may include an upstream region that extends from the front edge of the seat frame toward the vehicle rear, and a downstream region that is stored between the upstream region and the seat frame. The downstream region receives the gas from the upstream region so as to be expanded. According to this configuration, when the gas is flown from the upstream region to the downstream region, the downstream region pushes the seat frame. As a result, the reaction force can also be efficiently obtained by the seat frame, and the acceleration of the expansion and deployment and the improvement of the occupant restraint force can be realized.

The outer side expansion part explained above may also include a part that is wound. According to this configuration, the outer side expansion part can be efficiently stored in the limited space of the inside of the seatback.

The outer side expansion part explained above may also include a part that is folded in bellows. According to this configuration, the outer side expansion part can also be efficiently stored in the limited space of the inside of the seatback.

The inner side expansion part explained above may include an inner contact part that directly comes in contact with the seat frame or indirectly comes in contact with the seat frame by sandwiching another member between the inner contact part and the seat frame and extends from a position to which the inflator is attached toward the front edge of the seat frame, a third folded-back part with which the inner side expansion part is folded back from a front edge at the vehicle front side of the inner contact part toward the vehicle rear, and an inner folding part that further extends from the third folded-back part toward the front edge.

According to the configuration explained above, when the gas is flown into the inner side expansion part, due to the expansion of the inner side contact part and due to the expansion so as to make the third folded-back part to disappear, the inner side contact part pushes the seat frame. As a result, the inner side contact part becomes possible to efficiently obtain the reaction force directed from the seat frame toward the occupant side. In particular, the inner side expansion part is located at the upstream side of the flow of the gas in the airbag cushion. Therefore, according to the configuration explained above, because the reaction force directed toward the occupant side can be obtained at an initial stage of the expansion and deployment of the airbag cushion, the acceleration of the expansion and deployment of the entirety of the airbag cushion and the further improvement of the occupant restraint force can be realized.

The inner side expansion part explained above may also include a part that is wound. According to this configuration, the inner side expansion part can be efficiently stored in the limited space of the inside of the seatback.

The inner side expansion part explained above may also include a part that is folded in bellows. According to this configuration, the inner side expansion part can also be efficiently stored in the limited space of the inside of the seatback.

With respect to the side airbag device, a front edge of the seat frame explained above may be rounded. According to this configuration, the airbag cushion can be stored in the seatback and operated without being damaged.

With respect to the seat frame explained above, a thickness in a vehicle width direction of the front edge of the seat frame may be larger than a thickness in the vehicle width direction of a region rearwardly located from the front edge. According to this configuration, the airbag cushion can also be stored in the seatback and operated without being damaged.

Effects of the Invention

According to the present invention, it becomes possible to provide a side airbag device that can be efficiently stored in a seatback and can also achieve the improvement of the occupant restraint force.

BRIEF DESCRIPTION OF THE DRAWINGS

FIGS. 2A and 2B are diagrams that exemplarily show a cushion being in a stored state shown in FIG. 1B viewed from each of directions.

EXPLANATION OF REFERENCE SIGNS

Figure 1A:
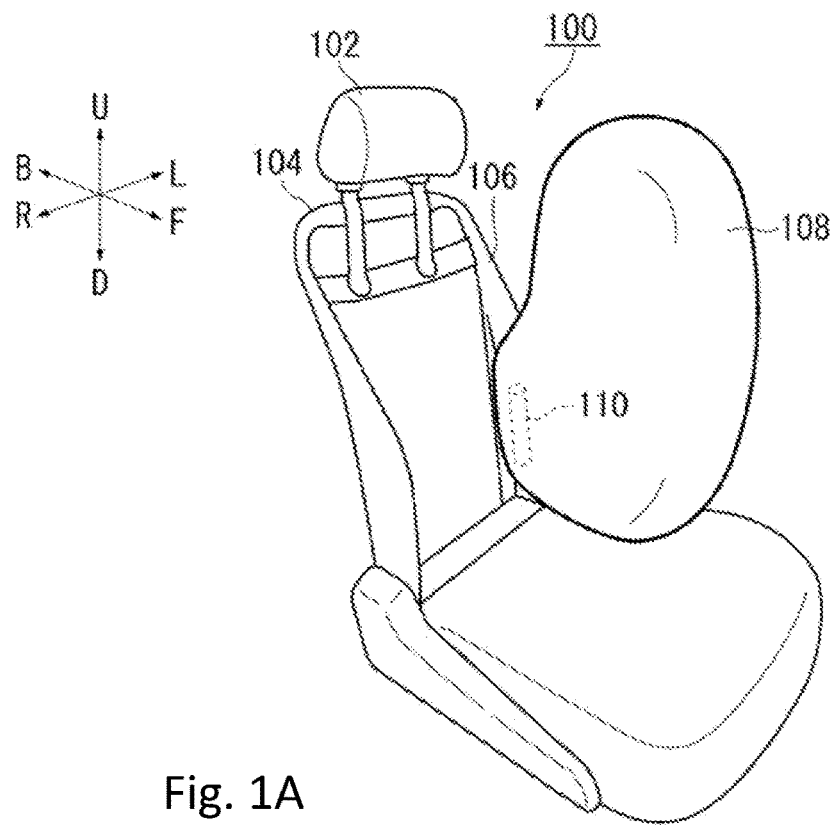
FIGS. 1A and 1B are diagrams that exemplarily show a side airbag device according to an embodiment of the present invention.

100—Side Airbag Device, 102—Seat, 104—Seatback, 106—Seat Frame, 108—Cushion, 110—Inflator, 112—Stud Bolt, 114—Inner Side Expansion Part, 115—First Folded-back Part, 116—Outer Side Expansion Part, 118—Front Edge of Seat Frame, 120—Seat Pad, 122—Side Surface of Inner Side of Seat Frame, 124—Reaction Force that Inner Side Expansion Part Obtains, 126—Cover, 128—Side Surface of Outer Side of Seat Frame, 130—Reaction Force that Outer Side Expansion Part Obtains, 132—Force for Making Folded-back between Inner Side Expansion Part and Outer Side Expansion Part to Disappear, 136—Cover, 140—Cushion of First Variation, 142—Outer Side Expansion Part of First Variation, 143—Outer Side Contact Part, 144—Second Folded-back Part, 160—Cushion of Second Variation, 162—Outer Side Expansion Part of Second Variation, 164—Upstream Region, 166—Downstream Region, 180—Cushion of Third Variation, 182—Outer Side Expansion Part of Third Variation, 200—Cushion of Fourth Variation, 202—Inner Side Expansion Part of Fourth Variation, 220—Cushion of Fifth Variation, 222—Inner Side Expansion Part of Fifth Variation, 224—Inner Folding Part, 225—Inner Side Contact Part, 226—Third Folded-back Part, 230—Seat Frame of Variation, and 232—Front Edge of Variation.

Mode for Carrying Out the Invention

Preferred embodiments of the present invention will be explained in detail below with reference to the attached drawings. The dimensions, materials, other concrete numerical values, and other that are disclosed in the embodiments are merely examples for facilitating understanding of the invention, and unless otherwise stated, they do not limit the present invention. Further, in the specification and the drawings, with respect to the elements having substantially the same functions and configurations, redundant explanations are omitted by accompanying the same reference numerals. Further, the elements that are not directly related to the present invention are not shown in the drawings.

FIG. 1 is a diagram that exemplarily shows a side airbag device 100 according to an embodiment of the present invention. FIG. 1A exemplarily shows the side airbag device 100 and a vehicle seat (a seat 102) that is located on the left side of a vehicle and in which the side airbag device 100 is utilized when viewed from an inner side (a compartment side) in a vehicle width direction. With respect to FIG. 1A and all other drawings according to the present application, the vehicle front and rear (longitudinal) direction denotes the arrows F (Forward) and B (Back), the vehicle width direction that corresponds to the left and right respectively denotes the arrows L (Left) and R (Right), and the vehicle vertical direction denotes the arrows U (Up) and D (Down).

In FIG. 1A, with respect to a seatback 104 of a seat 102, only a seat frame 106 is exemplarily shown by omitting a cover and a seat pad (for instance, a urethane material). The seat frame 106 is a member that becomes a framework of the seatback 104 and is built in the seatback 104 along a side surface and an upper edge of the seatback 104.

An airbag cushion (a cushion 108) is a part being formed in a bag shape by which an occupant is received upon an emergency event such as the occurrence of an impact on the vehicle, and is expanded and deployed in a flat shape toward a side of the occupant (not shown) that sits on the seat 102 by receiving a gas from an inflator 110. The cushion 108 is formed in the bag shape by sewing or adhering two stacked base cloths that configure a periphery of the cushion 108, or by spinning and weaving by utilizing the OPW (One-Piece Woven).

In the present embodiment, the cushion 108 is built in the vicinity of the side portion of the seat 102. The cushion 108 is installed on the seat frame 106 via the inflator 110. In particular, in the present embodiment, the cushion 108 and the inflator 110 are installed at a side of a center of the seat frame 106 in the vehicle width direction of the seat 102, i.e., the occupant side of the seat frame 106.

The inflator 110 is a gas generator and operates by receiving an operation signal that is transmitted from the vehicle side at the occurrence of the impact so as to supply the gas to an inside of the cushion 108. The inflator 110 that is adopted in the present embodiment is a cylinder type (a cylindrical type) and is installed at a vehicle rear side of the inside of the cushion 108 in a state in which the longitudinal direction of the inflator 110 aligns with the vertical direction. A stud bolt 112 (refer to FIG. 2B) is provided at the inflator 110. The stud bolt 112 is fastened to the seat frame 106 by penetrating through the cushion 108.

There are some kinds of the inflators that are spread through the market at the present time, such as a model in which a gas generating agent is filled and a gas is generated by burning the gas generating agent, a model in which a compressed gas is filled and a gas is supplied without generating heat, and a hybrid model in which a combustion gas and a compressed gas are used. Any kinds of the inflators can be utilized as the inflator 110.

Figure 1B:
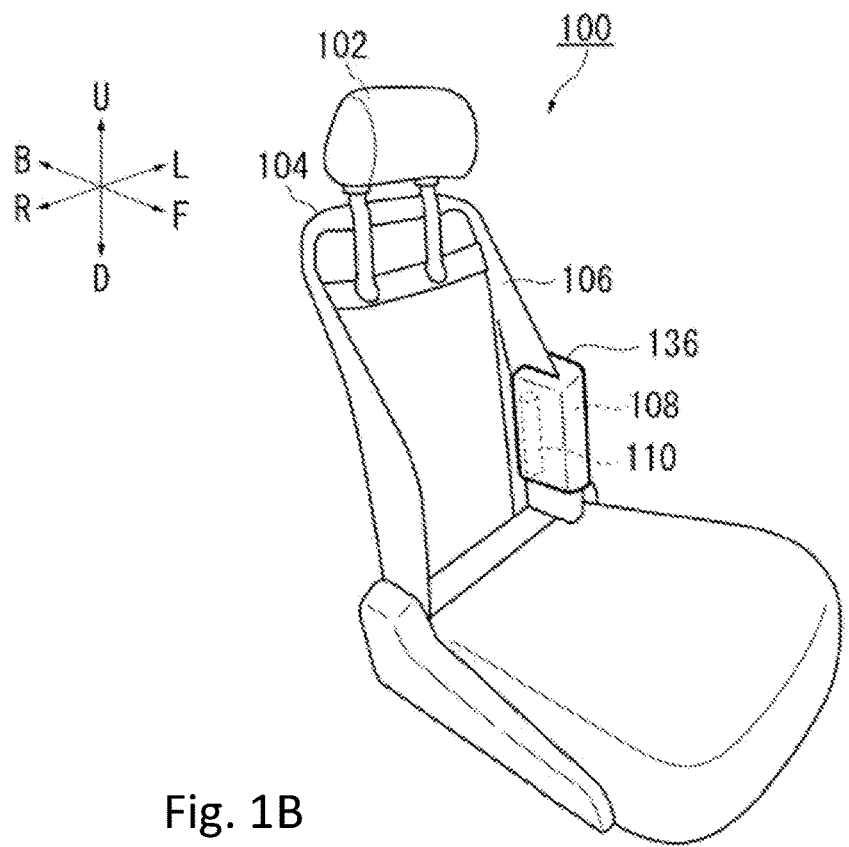

FIG. 1B is a diagram that exemplarily shows a state in which the cushion 108 shown in FIG. 1A is stored. As exemplarily shown in FIG. 1B, the airbag cushion 108 is stored inside the seatback 104 in the state in which its size is reduced by being wound and folded. In the present embodiment, the cushion is stored as the cushion sandwiches the seat frame 106 so as to be efficiently stored in the limited space of the inside of the seatback 104.

With respect to the cushion 108 being in a stored state, its periphery is covered by a cover 136. The cover 136 maintains the state of the cushion 108 inside the seatback 104 in which the size of the cushion 108 is reduced by being wound and folded. The cover 136 can be realized in various forms, such as a configuration of the wrapping by the same material as a base cloth of the cushion 108 or a nonwoven fabric and a configuration of a case-type that is formed by including a resin and a metal. Further, the cover 136 may have a configuration in which the entirety of the cushion 108 is covered. However, the cover 136 can maintain the cushion 108 when the cover 136 has a configuration in which only an area of the predetermined part is covered.

Because a predetermined fragile part is provided in the cover 136, the cushion 108 can be released by fracturing the cover 136 when the cushion 108 is expanded and deployed. When the cover 136 is formed by such as the base cloth or the nonwoven fabric, the fragile part can be realized by such as a broken-line-shaped slit, a nick-shaped notch, an oblong hole-shaped slot, and in addition, a configuration in which ends of the cloths are crimped each other. Further, when the cover 136 is a container-shaped configuration that is formed by the resin molding, it can also be realized by providing a tear line that is reduced in thickness so as to induce the breakage.

FIG. 2 is a diagram that exemplarily shows the cushion 108 being in the stored state shown in FIG. 1B when viewed from each of directions. FIG. 2A exemplarily shows the seat 102 shown in FIG. 1B when viewed from the vehicle rear side. As exemplarily shown in FIG. 2B, the cushion 108 is stored by being divided into an inner side expansion part 114 at the occupant side and an outer side expansion part 116 at an opposite side of the occupant side with respect to the seat frame 106 so as to sandwich the seat frame 106.

FIG. 2B is a cross-sectional view along the A-A line of such as the cushion 108 being in the stored state shown in FIG. 2A. As exemplarily shown in FIG. 2B, the inner side expansion part 114 is connected to the inflator 110 and receives the gas from the inflator 110 at the beginning within the cushion 108 so as to be expanded. The outer side expansion part 116 is continuously provided with the inner side expansion part 114 and receives the gas from the inner side expansion part 114 so as to be expanded and deployed. Because the cushion 108 being in the stored state is held at the seat frame 106 by being covered with the cover 136 explained above, the cushion 108 can be built in the seatback 104 in a state in which the inner side expansion part 114 and outer side expansion part 116 are formed.

The cushion 108 is folded back along a front edge 118 of the seat frame 106 between the inner side expansion part 114 and outer side expansion part 116 so that a first folded-back part 115 is provided. According to this configuration, it is possible that the cushion 108 is efficiently stored at the both sides that sandwich the seat frame 106 in the inside of the seatback 104.

As explained above, in the present embodiment, because the cushion 108 is stored by being divided into at the occupant side and at the opposite side with respect to the seat frame 106, the limited space of the inside of the seatback 104 in which such as a seat pad 120 is filled can be efficiently utilized. The side airbag device 100 can be applied to various vehicle seats that have a wide space or a narrow space with respect to a periphery of the seat frame 106 so as to have a high versatility. Further, because the installation space can be made narrow, the miniaturization of the vehicle seat can also be realized.

With respect to the side airbag device 100, the front edge 118 of the seat frame 106 is bent so as to be rounded. As a result, with respect to the seat frame 106, a thickness in the vehicle width direction of a region of the front edge 118 is larger to some extent than a thickness in the vehicle width direction of a region rearwardly located from the front edge 118, for instance, such region corresponding to a region that extends in the front and rear direction of the seat and to which the stud bolt 112 of the inflator 110 is fasten. When the cushion 108 is stored by being divided into the inner side expansion part 114 and the outer side expansion part 116 and when the cushion 108 is expanded and deployed, this front edge 118 does not give a burden to the cushion 108. Therefore, the cushion 108 can be efficiently stored in the seatback 104 and can operate without being damaged.

With respect to the side airbag device 100, because the inner side expansion part 114 and the outer side expansion part 116 are separately stored, it is possible to not only be efficiently stored inside the seatback 104 that is narrow but also improve the acceleration of the expansion and deployment and the occupant restraint force. A further configuration according to the side airbag device 100 will be explained with reference to FIG. 3 below.

Figure 3A:
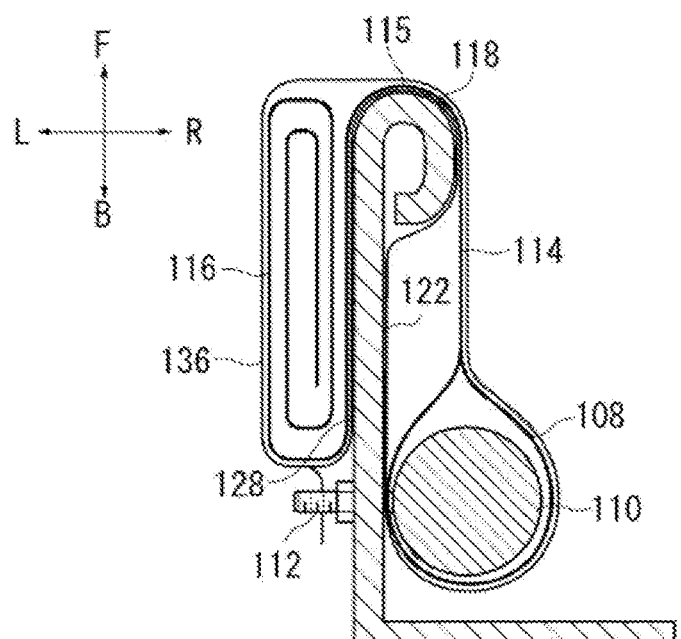
FIGS. 3A, 3B, and 3C are diagrams that exemplarily show a process in which the cushion shown in FIG. 2B is expanded and deployed.

FIG. 3 is a diagram that exemplarily shows a process in which the cushion 108 shown in FIG. 2B is expanded and deployed. FIG. 3A exemplarily shows an overview of the cushion 108 being in the stored state shown in FIG. 2B. As exemplarily shown in FIG. 3A, substantial parts of the outer side expansion part 116 are wound so as to reduce (shrink) in size. As a result, the outer side expansion part 116 can be efficiently stored in the limited space of the inside of the seatback 104.

Figures 3B, 3C:
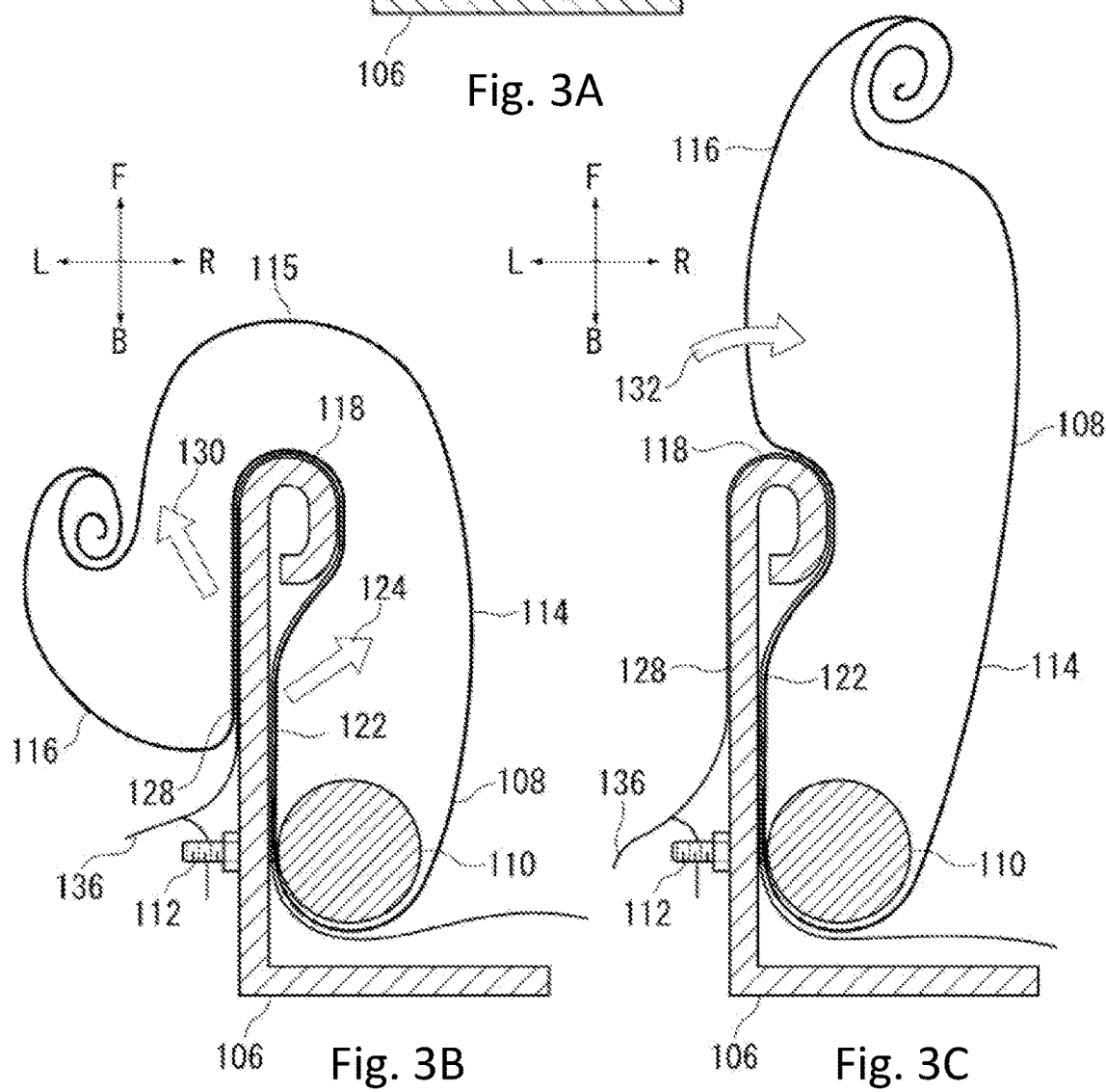

FIG. 3B exemplarily shows a state immediately after the inflator 110 shown in FIG. 3A operated. As shown in FIG. 3B, when the gas is supplied from the inflator 110, the inner side expansion part 114 and the outer side expansion part 116 start to be expanded and deployed. By this force, the cover 136 is broken at the predetermined fragile part and releases the cushion 108.

With respect to the cushion 108, first of all, the inner side expansion part 114 that is stored at the occupant side of the seat frame 106 starts to be expanded. At this time, because the inner side expansion part 114 pushes a side surface 122 of the inner side of the seat frame 106 directly or indirectly through the cover 136, the inner side expansion part 114 can receive a reaction force 124. Because the inner side expansion part 114 is located at an upstream of the flow of the gas in the cushion 108, the cushion 108 can receive the reaction force 124 directed from the seat frame 106 toward the occupant side by the inner side expansion part 114 at an early stage. Because of the reaction force 124 that the inner side expansion part 114 receives by the seat frame 106, the cushion 108 can efficiently push aside, for instance, the seat pad 120 (refer to FIG. 2B) and the cover 126 so that the cushion 108 can be expanded and deployed more rapidly.

As exemplarily shown in FIG. 3A, in the present embodiment, the outer side expansion part 116 is stored in the seatback 104 in a state in which the outer side expansion part 116 directly comes in contact with the side surface 128 of the outer side of the seat frame 106 or in a state in which the outer side expansion part 116 indirectly comes in contact with the side surface 128 via the cover 136 that is another member. According to this configuration, as exemplarily shown in FIG. 3B, when the outer side expansion part 116 is expanded, the outer side expansion part 116 can efficiently receive a reaction force 130 by pushing the side surface 128 of the seat frame 106 directly or indirectly through the cover 136. Even when the outer side expansion part 116 receives the reaction force 130 by the seat frame 106, the cushion 108 can be expanded and deployed more rapidly.

FIG. 3C exemplarily shows a state in which the cushion 108 shown in FIG. 3A is further expanded and deployed. As explained above, the cushion 108 is rapidly expanded and deployed from the inside of the seatback 104 (refer to FIG. 2B) toward the side of the occupant by utilizing such as the reaction force 124 that the inner side expansion part 114 receives by the seat frame 106 (refer to FIG. 3B), the reaction force 130 that the outer side expansion part 116 receives by the seat frame 106, and in addition, a force 132 for making the first folded-back part 115 to disappear that is located between the inner side expansion part 114 and the outer side expansion part 116.

As explained above, because the cushion 108 is rapidly exposed from the seatback 104, the cushion 108 can perform to push the occupant toward the direction away from the vehicle collision side at an early stage in a detection of an impact and a pre-detection of the impact, that is, the cushion 108 can perform a pre-push function. According to the pre-push function, because the occupant is push back to some extent before the entirety of the cushion 108 is expanded, the impact is reduced when the occupant is restrained by the entirety of the cushion 108 so that the injury value of the occupant can be suppressed.

The inner side expansion part 114 is provided at the occupant side of the seat frame 106, and the inner side expansion part 114 is also the basis of the cushion 108. Therefore, after the cushion 108 is expanded, the cushion 108 is also located at the occupant side of the seat frame 106, that is, the cushion 108 is positioned closer to the occupant.

According to this configuration, the occupant restraint force can also be improved.

First Variation of Cushion

FIG. 4 is a diagram that exemplarily shows first and second variations of the cushion 108 shown in FIG. 3. FIG. 4A corresponds to FIG. 3A and exemplarily shows a cushion 140 according to the first variation. The cushion 140 is different from the cushion 108 shown in FIG. 3A with respect to a configuration relating to a reduction (shrinkage) method of an outer side expansion part 142. In the following descriptions, with respect to the elements that are already explained, the explanations thereof are omitted by accompanying the same reference numerals. Further, when there are the elements that have different reference numerals and when these elements have the same names with the elements that are already explained, the basic configuration and functions of these elements are the same as the already explained elements.

Figure 4A:
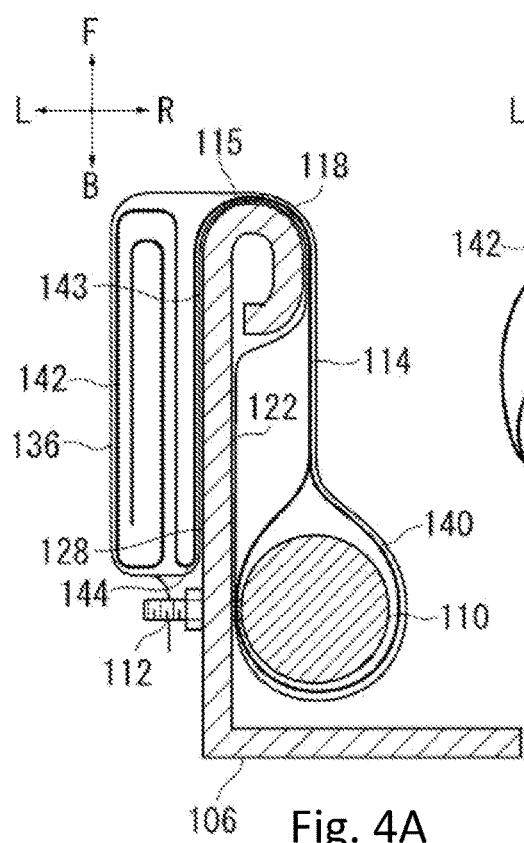
FIGS. 4A, 4B, 4C, and 4D are diagrams that exemplarily show first and second variations of the cushion shown in FIG. 3.

As exemplarily shown in FIG. 4A, an outer side contact part 143 that comes in contact with a predetermined area of the side surface 128 extending from the front edge 118 toward the vehicle rear is formed at the outer side expansion part 142. The outer side contact part 143 is in a state in which the outer side contact part 143 directly comes in contact with the side surface 128 or in a state in which the outer side contact part 143 indirectly comes in contact with the side surface 128 via the cover 136 that is another member.

A second folded-back part 144 is also formed at the outer side expansion part 142. The second folded-back part 144 is formed by being folded back from a rear end at the vehicle rear side of the outer side contact part 143 toward the vehicle front.

Figure 4B:
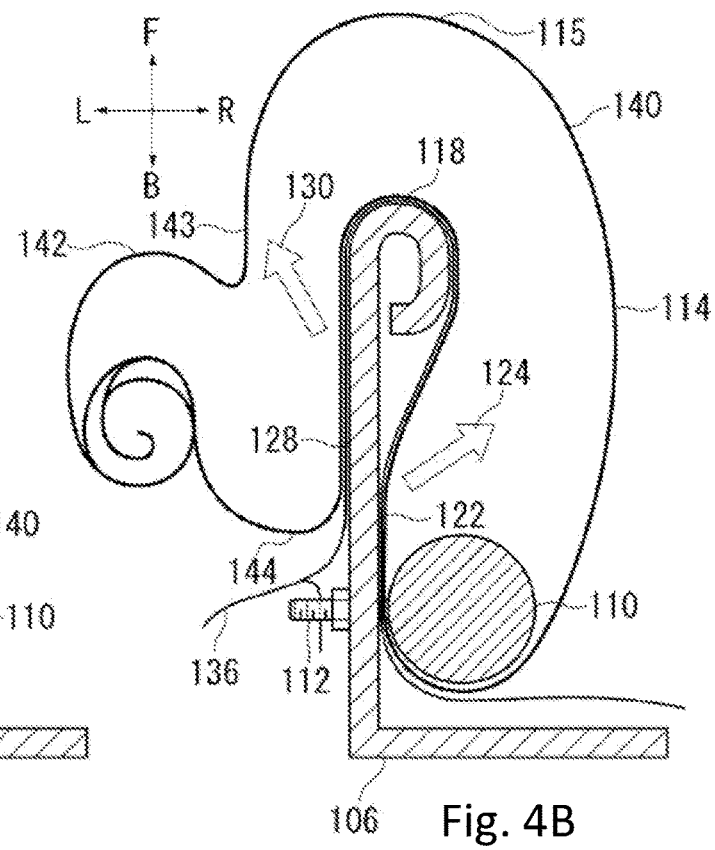

FIG. 4B exemplarily shows a state immediately after the inflator 110 shown in FIG. 4A operated. When the gas is flown into the outer side expansion part 142, the outer side contact part 143 is expanded first, and thereafter the second folded-back part 144 is expanded so as to make the folded-back to disappear. As a result, the rest of the outer side expansion part 142 can be expanded and deployed while the rest of the outer side expansion part 142 receives the reaction force 130 by more efficiently pushing the side surface 128 of the seat frame 106. As explained above, the cushion 140 can be expanded and deployed more rapidly from the inside of the seatback 104 (refer to FIG. 2B) toward the side of the occupant by having the outer side contact part 143 and the second folded-back part 144 so that the occupant restraint force can be improved.

Second Variation of Cushion

Figure 4C:
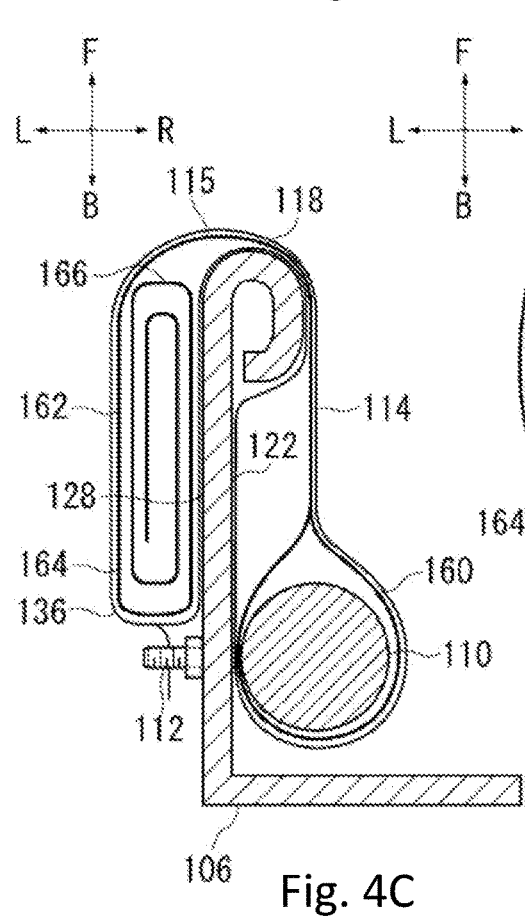

FIG. 4C corresponds to FIG. 3A and exemplarily shows a cushion 160 according to the second variation. The cushion 160 is also different from the cushion 108 shown in FIG. 3A with respect to a configuration relating to a reduction (shrinkage) method of an outer side expansion part 162.

As exemplarily shown in FIG. 4C, with respect to the outer side expansion part 162, an upstream region 164 extends from the front edge 118 of the seat frame 106 toward the vehicle rear and is located at the outermost position in the vehicle width direction of the outer side expansion part 162. Further, a downstream region 166 that is wound is stored between the upstream region 164 and the seat frame 106. The downstream region 166 is a region that is expanded by receiving the gas from the upstream region 164 and is stored in a state in which the downstream region 166 directly comes in contact with the side surface 128 of the seat frame 106 or in a state in which the downstream region 166 indirectly comes in contact with the side surface 128 via the cover 136.

Figure 4D:
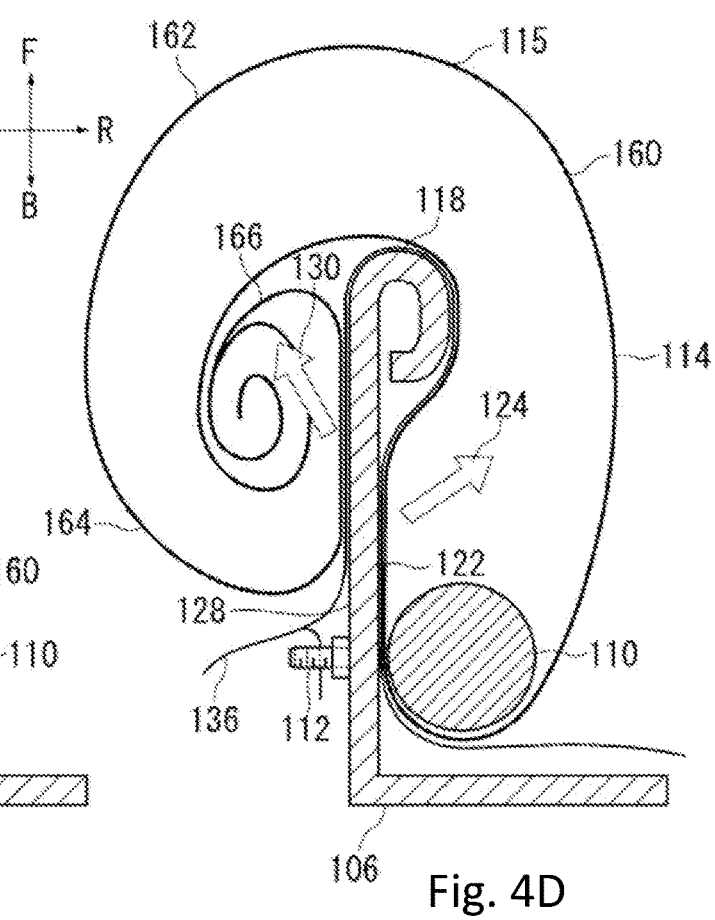

FIG. 4D exemplarily shows a state immediately after the inflator 110 shown in FIG. 4A operated. With respect to the outer side expansion part 162, when the gas is flown from the upstream region 164 into the downstream region 164, the downstream region 166 is expanded while the downstream region 166 pushes the side surface 128 of the seat frame 106 directly or indirectly through the cover 136. As a result, the outer side expansion part 162 can also more efficiently push the side surface 128 of the seat frame 106 so as to receive the reaction force 130. The cushion 160 can be expanded and deployed more rapidly from the inside of the seatback 104 (refer to FIG. 2B) toward the side of the occupant by the upstream region 164 and the downstream region 166 so that the occupant restraint force can be improved.

Third Variation of Cushion

FIG. 5 is a diagram that exemplarily shows third and fourth variations of the cushion 108 shown in FIG. 3. FIG. 5A corresponds to FIG. 3A and exemplarily shows a cushion 180 according to the third variation. The cushion 180 is also different from the cushion 108 shown in FIG. 3A with respect to a configuration relating to a reduction (shrinkage) method of an outer side expansion part 182.

Figure 5A:
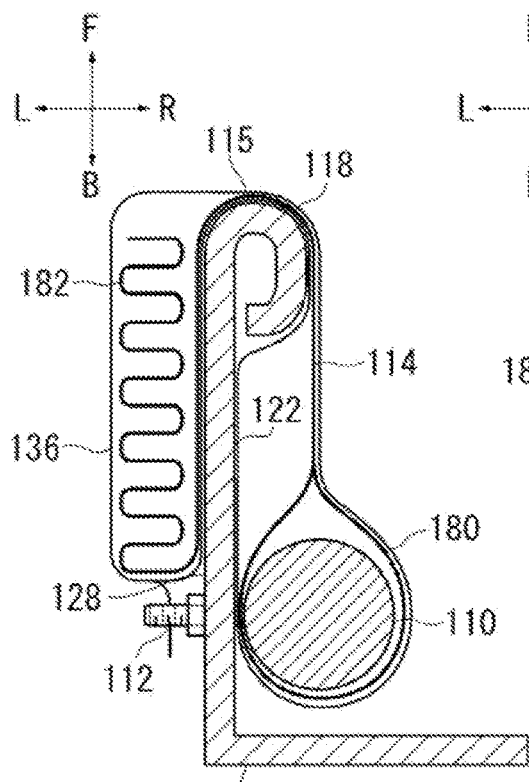
FIGS. 5A, 5B, 5C, and 5D are diagrams that exemplarily show third and fourth variations of the cushion shown in FIG. 3.

As exemplarily shown in FIG. 5A, with respect to the outer side expansion part 182, substantial parts are folded in bellows so as to reduce (shrink) in size, and the outer side expansion part 182 are stored in a state in which the outer side expansion part 182 directly comes in contact with the side surface 128 of the seat frame 106 or in a state in which the outer side expansion part 182 indirectly comes in contact with the side surface 128 via the cover 136. According to this configuration, in the same manner as the outer side expansion part 116 that is wound and shown in FIG. 3A, the outer side expansion part 182 can be efficiently stored in the limited space of the inside of the seatback 104 (refer to FIG. 2B).

Figure 5B:
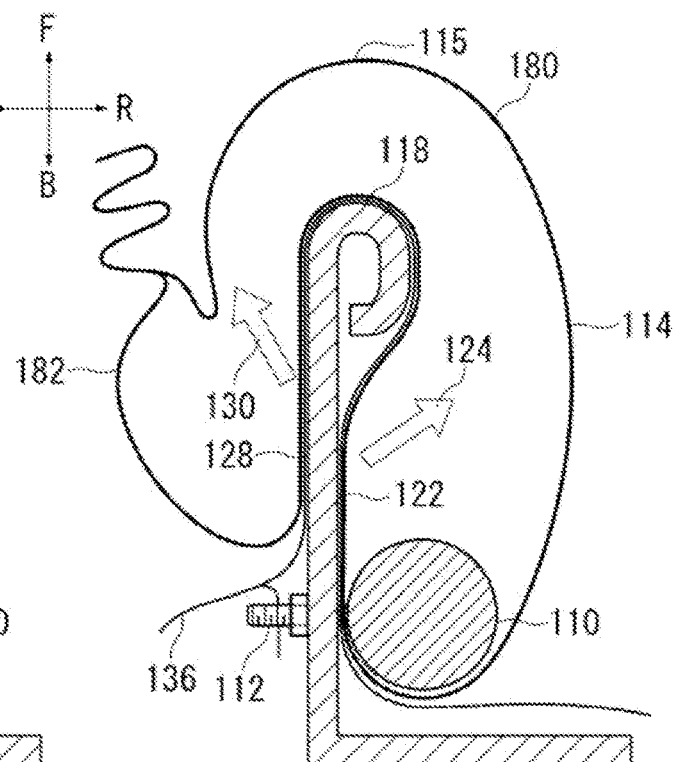

FIG. 5B exemplarily shows a state immediately after the inflator 110 shown in FIG. 5A operated. With respect to the cushion 180, because the outer side expansion part 182 is stored in the state in which the outer side expansion part 182 directly or indirectly comes in contact with the side surface 128 of the outside of the seat frame 106, the outer side expansion part 182 can also efficiently receive the reaction force 130 by pushing the side surface 128 of the seat frame 106 directly or indirectly through the cover 136 when the outer side expansion part 182 is expanded. Because the outer side expansion part 182 receives the reaction force 130 by the seat frame 106, the cushion 180 can be expanded and deployed more rapidly.

With respect to the cushion 180 shown in FIG. 5A, the outer side contact part 143 and the second folded-back part 144 shown in FIG. 4A can also be provided in combination with the configuration. By combining the second folded-back part 144 and so on, the outer side expansion part 182 that is folded in bellows can also efficiently receive the reaction force 130 by the seat frame 106. Further, with respect to the cushion 180, it is also possible that the upstream region 164 shown in FIG. 4C is provided and the part being folded in bellows is stored at a corresponding position of the downstream region 166. According to this configuration, the outer side expansion part 182 can also efficiently receive the reaction force 130 by the seat frame 106.

Fourth Variation of Cushion

Figure 5C:
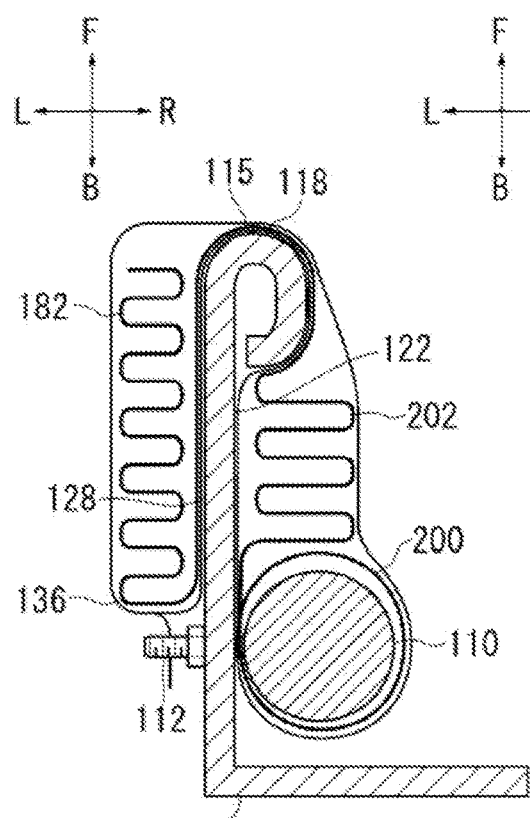

FIG. 5C is a diagram that exemplarily shows a fourth variation of the cushion 108 shown in FIG. 3. FIG. 5C corresponds to FIG. 3A and exemplarily shows a cushion 200 according to the fourth variation. With respect to the cushion 200, not only the outer side expansion part 182 are folded in bellows but also an inner side expansion part 202 are folded in bellows. Although the part being folded in bellows is included in the inner side expansion part 202, the cushion 200 can be efficiently stored in the limited space of the inside of the seatback 104 (refer to FIG. 2B).

Figure 5D:
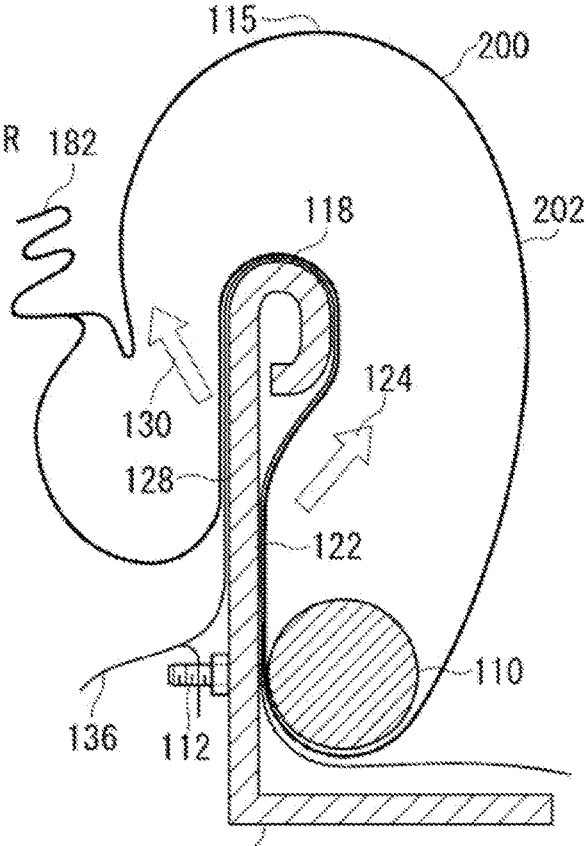

FIG. 5D exemplarily shows a state immediately after the inflator 110 shown in FIG. 5C operated. As exemplarily shown in FIG. 5D, the cushion 200 starts to be expanded from the inner side expansion part 202 that is stored at the occupant side of the seat frame 106. At this time, the inner side expansion part 202 can be expanded while the inner side expansion part 202 makes the part being folded in bellows to be eliminated (disappear) and receives the reaction force 124 by pushing the side surface 122 of the inner side of the seat frame 106 directly or indirectly through the cover 136. Because the inner side expansion part 202 is located at an upstream of the flow of the gas in the cushion 200, the cushion 200 can receive the reaction force 130 directed from the seat frame 106 toward the occupant side by the inner side expansion part 202 at an early stage. Because the inner side expansion part 202 receives the reaction force 130 by the seat frame 106, the cushion 200 can efficiently push aside, for instance, the seat pad 120 (refer to FIG. 2B) and the cover 126 so that the cushion 200 can be expanded and deployed more rapidly.

With respect to the cushion 200 shown in FIG. 5C, in the same manner as the cushion 180 shown in FIG. 5A, it is also possible that the outer side contact part 143 and the second folded-back part 144 shown in FIG. 4A are combined with the configuration or that the part being folded in bellows is stored at a corresponding position of the downstream region 166 by combining the upstream region 164 shown in FIG. 4C. Further, the inner side expansion part 202 can also be provided in combination with the outer side expansion part 116 shown in FIG. 3A, the outer side expansion part 142 shown in FIG. 4B, and the outer side expansion part 162 shown in FIG. 4C.

Fifth Variation of Cushion

Figure 6A:
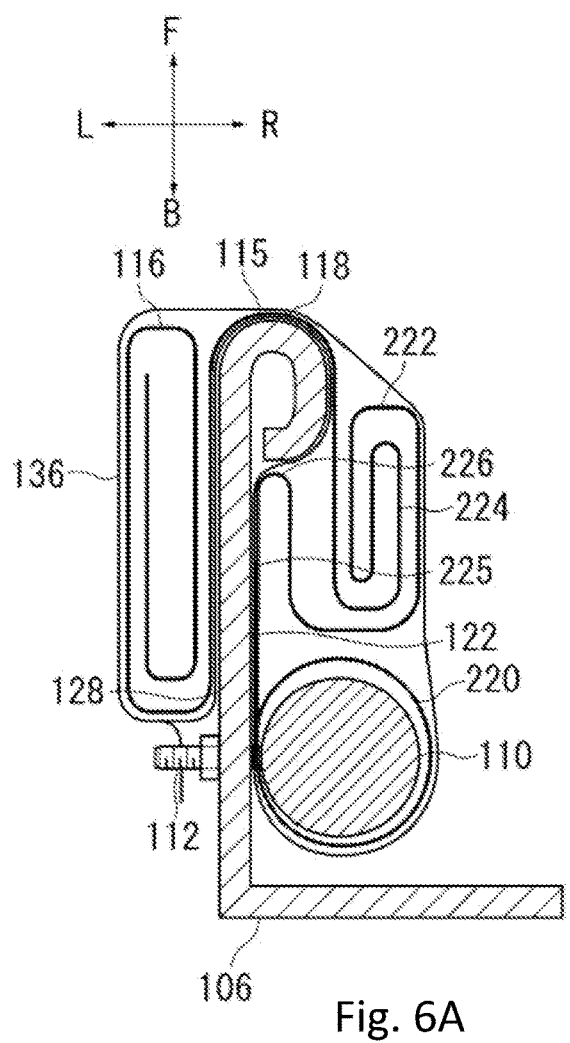
FIGS. 6A and 6B are diagrams that exemplarily show a fifth variation of the cushion shown in FIG. 3.
Figure 6B:
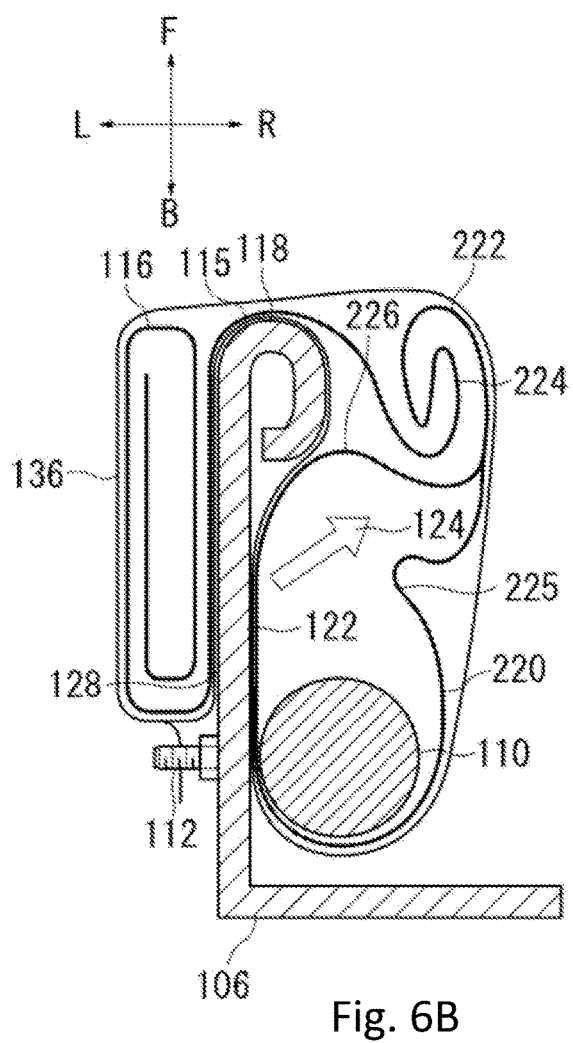

FIG. 6 is a diagram that exemplarily shows a fifth variation of the cushion 108 shown in FIG. 3. FIG. 6A corresponds to FIG. 3A and exemplarily shows a cushion 220 according to the fifth variation. With respect to the cushion 220, not only the outer side expansion part 116 is stored by being wound but also an inner side expansion part 222 is stored by being wound. Although the inner side expansion part 222 includes the part (an inner folding part 224) being reduced in size by winding and folding, the cushion 220 can be efficiently stored in the limited space of the inside of the seatback 104 (refer to FIG. 2B).

An inner side contact part 225 and a third folded-back part 226 are also provided at the inner side expansion part 222. The inner side contact part 225 extends from a position of the seat frame 106 to which the inflator 110 is attached toward the front edge 118 of the seat frame 106 while the inner side contact part 225 directly comes in contact with the side surface 122 of the seat frame 106 or indirectly comes in contact with the side surface 122 via the cover 136 that is another member.

The third folded-back part 226 is formed by being folded back from the front edge at the vehicle front of the inner side contact part 225 toward the vehicle rear. The inner folding part 224 is provided at a distal position of the third folded-back part 226 and the base cloth of the inner side expansion part 222 extends from the third folded-back part 226 toward the front edge 118 again.

According to the configuration explained above, when the gas is flown into the inner side expansion part 222, because the inner side contact part 225 is expanded first so that the third folded-back part 226 is expanded so as to eliminate the folded-back, the inner side contact part 225 pushes the side surface 128 of the seat frame 106 directly or indirectly through the cover 136. As a result, it becomes possible that the reaction force 130 directed from the seat frame 106 toward the occupant side is efficiently received immediately after starting the inflow of the gas. Therefore, according to the configuration explained above, because the reaction force 124 directed toward the occupant side can be obtained at the initial stage of the expansion and deployment of the cushion 220, the acceleration of the expansion and deployment and the further improvement of the occupant restraint force can be realized.

Further, in the same manner as the inner side expansion part 202 shown in FIG. 5C, the inner side expansion part 222 can also be provided in combination with any of the outer side expansion parts 116, 142, 162, and 182 explained above. Further, the inner side contact part 225 and the third folded-back part 226 can be provided in combination with the inner side expansion part 222 that is folded in bellows shown in FIG. 5C.

Variation of Seat Frame

Figure 7:
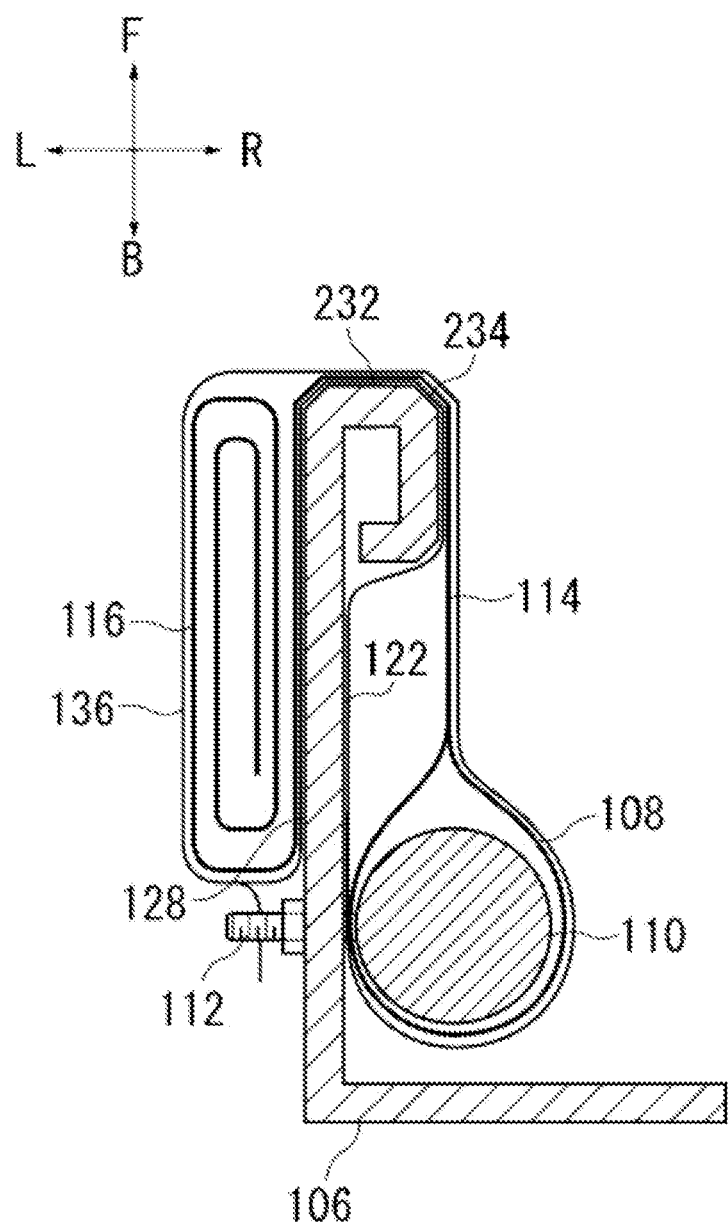
FIG. 7 is a diagram that exemplarily shows a variation of a seat frame shown in FIG. 3A.

FIG. 7 is a diagram that exemplarily shows a variation of the seat frame 106 shown in FIG. 3A. A seat frame 106 is different from the seat frame 106 shown in FIG. 3A with respect to a configuration of a front edge 232.

The front edge 232 of the seat frame 106 is thicker in the vehicle width direction. In addition, a chamfer 234 is provided so as to eliminate an acute angle. In other words, with respect to the seat frame 106, a thickness in the vehicle width direction of a region of the front edge 232 in which the chamfer 234 is provided is larger to some extent than a thickness in the vehicle width direction of a region rearwardly located from the front edge 232, for instance, such region corresponding to a region that extends in the front and rear direction of the seat and to which the stud bolt 112 of the inflator 110 is fasten. In the same manner as the front edge 118 (refer to FIG. 3A) that is rounded, when the cushion 108 is stored by being divided into the inner side expansion part 114 and the outer side expansion part 116 and when the cushion 108 is expanded and deployed, this front edge 232 also does not give a burden to the cushion 108. Therefore, the cushion 108 can be efficiently stored in the seatback 104 (refer to FIG. 2B) and can operate without being damaged.

Although the preferred embodiments of the present invention have been described with reference to the attached drawings, the above-described embodiments are preferred examples of the present invention, and other embodiments can also be carried out in various ways. Unless there is a limited description in the specification, the present invention should not be limited to the detailed shape, size, configuration, and arrangement of parts shown in the attached drawings. Further, the expressions and terms used in the specification are for illustrative purposes, and unless there is a limited description, the same are not limited thereto.

Accordingly, it will be apparent to one of ordinary skill in the art to conceive various modifications within the scope of the claims. All such modifications are intended to be included within the technical scope of the present invention.

Industrial Applicability of the Invention

The present invention can be utilized to a side airbag device that is provided in a vehicle seat.

What is claimed is:

1. A side airbag device in combination with a vehicle seat, the side airbag device comprising:
a seat frame that is along a side surface of a seatback of the vehicle seat, the seat frame being built in the seatback;
an inflator that is attached to an occupant side of the seat frame; and
an airbag cushion for receiving a gas from the inflator so as to be expanded and deployed, wherein the airbag cushion includes:
an inner side expansion part stored at the occupant side of the seat frame, the inner side expansion part being connected to the inflator; and
an outer side expansion part continuously provided with the inner side expansion part, the outer side expansion part stored at an opposite side of the seat frame with respect to the occupant side, the outer side expansion part connected to the inner side expansion part for receiving the gas from the inner side expansion part so as to be expanded and deployed,
wherein the vehicle seat include a seat pad having an inner seat pad portion and an outer seat pad portion laterally spaced apart from each other, the inner seat pad portion including planar surface for contacting the airbag, the planar surface extending at a non-parallel angle relative to a both a forward direction and a lateral direction, and
wherein the airbag contacts the inner seat pad portion when the airbag is stowed in the seat.

2. The side airbag device according to claim 1, wherein the outer side expansion part is stored in the seatback in a state in which the outer side expansion part directly comes in contact with the seat frame or a state in which the outer side expansion part indirectly comes in contact with the seat frame by sandwiching another member between the outer side expansion part and the seat frame.

3. The side airbag device according to claim 1, wherein the airbag cushion has a first folded-back part located between the inner side expansion part and the outer side expansion part, and the airbag cushion is folded back along a front edge of the seat frame with respect to the first folded-back part.

4. The side airbag device according to claim 3, wherein the outer side expansion part includes:
an outer contact part that directly comes in contact with a predetermined area of the seat frame extending from the front edge of the seat frame toward a vehicle rear or indirectly comes in contact with the predetermined area by sandwiching another member between the outer contact part and the predetermined area; and
a second folded-back part with which the outer side expansion part is folded back from a rear end at a vehicle rear side of the outer contact part toward a vehicle front.

5. The side airbag device according to claim 3, wherein the outer side expansion part includes:
an upstream region that extends from the front edge of the seat frame toward a vehicle rear; and
a downstream region that is stored between the upstream region and the seat frame, the downstream region for receiving the gas from the upstream region so as to be expanded.

6. The side airbag device according to claim 1, wherein the outer side expansion part includes a part that is wound.

7. The side airbag device according to claim 1, wherein the outer side expansion part includes a part that is folded in bellows.

8. The side airbag device according to claim 1, wherein the inner side expansion part includes:
an inner contact part that directly comes in contact with the seat frame or indirectly comes in contact with the seat frame by sandwiching another member between the inner contact part and the seat frame and extends from a position to which the inflator is attached toward a front edge of the seat frame;

a third folded-back part with which the inner side expansion part is folded back from a front edge at a vehicle front side of the inner contact part toward a vehicle rear; and
an inner folding part that further extends from the third folded-back part toward the front edge.

9. The side airbag device according to claim 1, wherein the inner side expansion part includes a part that is wound.

10. The side airbag device according to claim 1, wherein the inner side expansion part includes a part that is folded in bellows.

11. The side airbag device according to claim 1, wherein a front edge of the seat frame is rounded.

12. The side airbag device according to claim 1, wherein a thickness in a vehicle width direction of a front edge of the seat frame is larger than a thickness in the vehicle width direction of a region rearwardly located from the front edge.

13. A side airbag device in combination with a vehicle seat, the side airbag device comprising:
a seat frame that is along a side surface of a seatback of the vehicle seat, the seat frame being built in the seatback;
an inflator that is attached to an occupant side of the seat frame; and
an airbag cushion for receiving a gas from the inflator so as to be expanded and deployed,
wherein the airbag cushion includes:
an inner side expansion part stored at the occupant side of the seal frame, the inner side expression part being connected to the inflator; and
an outer side expansion part continuously provided with the inner side expansion part, the outer side expansion part stored at an opposite side of the seat frame with respect to the occupant side, the outer side expansion part connected to the inner side expansion part for receiving the gas from the inner side expansion part so as to be expanded and deployed,
wherein the vehicle seat include a seat pad having an inner seat pad portion and an outer seat pad portion laterally spaced apart from each other, the inner seat pad portion including planar surface for contacting the airbag, the planar surface extending at a non-parallel angle relative to a both forward direction and a lateral direction, and
wherein the inner side expansion part includes a first wound portion on the occupant side of the seat frame, and wherein the outer side expansion part includes a second wound portion on the opposite side of the seat frame.

14. A side airbag device comprising:
a seat frame that is along a side surface of a seatback of a vehicle seat, the seat frame being built in the seatback;
an inflator that is attached to an occupant side of the seat frame; and
an airbag cushion for receiving a gas from the inflator so as to be expanded and deployed,
wherein the airbag cushion includes:
an inner side expansion part stored at the occupant side of the seat frame, the inner side expansion part being connected to the inflator; and
an outer side expansion part continuously provided with the inner side expansion part, the outer side expansion part stored at an opposite side of the seat frame with respect to the occupant side, the outer side expansion part connected to the inner side expansion part for receiving the gas from the inner side expansion part so as to be expanded and deployed, wherein the inner side expansion part includes a first wound portion on the occupant side of the seat frame, and wherein the outer side expansion part includes a second wound portion on the opposite side of the seat frame.

\* \* \* \* \*